(12) United States Patent
Snider (10) Patent No.: US 11,347,291 B2
(45) Date of Patent: *May 31, 2022

(54) ELECTROCHROMIC FILM INDICATOR FOR A BATTERY POWERED DEVICE

(71) Applicant: Schlage Lock Company LLC, Carmel, IN (US)

(72) Inventor: Chris R. Snider, Noblesville, IN (US)

(73) Assignee: Schlage Lock Company LLC, Carmel, IN (US)

(*) Notice: Subject to any disclaimer, the term of this patent is extended or adjusted under 35 U.S.C. 154(b) by 294 days.

This patent is subject to a terminal disclaimer.

(21) Appl. No.: 16/671,553

(22) Filed: Nov. 1, 2019

(65) Prior Publication Data
US 2021/0132677 A1   May 6, 2021

(51) Int. Cl.
| | |
|---|---|
| G08B 21/00 | (2006.01) |
| G06F 1/3212 | (2019.01) |
| G06F 1/28 | (2006.01) |
| G09G 3/38 | (2006.01) |
| G08B 5/22 | (2006.01) |
| G08B 21/18 | (2006.01) |
| G07C 9/00 | (2020.01) |

(52) U.S. Cl.
CPC .............. *G06F 1/3212* (2013.01); *G06F 1/28* (2013.01); *G07C 9/00658* (2013.01); *G08B 5/22* (2013.01); *G08B 21/182* (2013.01); *G09G 3/38* (2013.01)

(58) Field of Classification Search
CPC . G06F 1/3212; G06F 1/28; G06F 3/14; G07C 9/00658; G07C 9/00174; G07C 2209/62; G07C 9/857; G08B 5/22; G08B 21/182; G08B 5/36; G09G 3/38; G09G 2354/00; G02F 1/163
See application file for complete search history.

(56) References Cited

U.S. PATENT DOCUMENTS

| | | | |
|---|---|---|---|
| 2016/0155375 A1* | 6/2016 | Park | H04M 1/724 345/173 |
| 2017/0081877 A1* | 3/2017 | Ng | G07C 9/0069 |

* cited by examiner

*Primary Examiner* — An T Nguyen
(74) *Attorney, Agent, or Firm* — Taft Stettinius & Hollister LLP (57) ABSTRACT

A user interface display system associated with an electronic lock that provides feedback to a user engaging the electronic lock, including a user interface display positioned on the electronic lock to depict to the user status patterns with each displayed status pattern being in response to a status of the electronic lock and provides feedback to the user as to the status of the electronic lock. An electrochromic film positioned on the user interface display and transitions a color for each displayed status pattern to correspond to the status pattern depicted to the user that provides the status of the electronic lock to the user. A controller transitions the electrochromic film to each color to correspond with the status pattern that is depicted by the user interface display so that the transitioned color and the displayed status pattern is in response to the status of the electronic lock.

20 Claims, 6 Drawing Sheets

ELECTROCHROMIC FILM INDICATOR FOR A BATTERY POWERED DEVICE

BACKGROUND

Field of Disclosure

The present disclosure generally relates to user interface displays, and more specifically to an electrochromic colored film indicator for user interface displays associated with access control.

Related Art

Conventional user interface displays may typically include light emitting diodes (LEDs) that are positioned in the conventional user interface display either as stand-alone indicator or illuminating a graphic or symbol.

BRIEF SUMMARY

Embodiments of the present disclosure relate to incorporating an electrochromic film into a user interface display system associated with access control provide a colored graphic as part of the user interface display system as the user interface display system provides feedback to the user. In an embodiment, a user interface display system associated with an electronic lock provides feedback to a user engaging the electronic lock. A user interface display is positioned on the electronic lock and is configured to transition a color depicted by the user interface display to correspond to the status pattern depicted by the user interface display. Each displayed status pattern provides a corresponding color associated with the feedback that is provided to the user as to the status of the electronic lock. A controller is configured to transition the electrochromic film visibility to each color to correspond with the status pattern that is depicted by the user interface display so that the color and the displayed status pattern is in response to the status of the electronic lock.

In an embodiment, a method provides feedback to a user engaging an electronic lock. A plurality of status patterns is depicted to the user via a user interface display positioned on the electronic lock with each displayed status pattern being in response to a status of the electronic lock. Each displayed status pattern provides feedback to the user as to the status of the electronic lock. A color depicted by the user interface display is transitioned via an electrochromic film to correspond to the status pattern depicted by the user interface display. Each displayed status pattern provides a corresponding color associated with the feedback that is provided to the user as to the status of the electronic lock. The electrochromic film activated via a controller to correspond with the status that is depicted by the user interface display so that the activated electrochromic film color is in response to the status of the electronic lock.

In an embodiment, a user interface display system is positioned on an electronic lock and provides feedback to a user engaging the electronic lock. A user interface display is positioned on the electronic lock and configured to depict to the user a locked state indicator being in response to a locked state on the electronic lock. An electrochromic film is positioned on the user interface display and is activated to a color depicted by the user interface display to a red color to correspond to the status depicted by the user interface display. The displayed locked state indicator displayed in the red color provides to the user that the electronic lock is in the locked state. A controller is configured to transition the electrochromic film to the red color to correspond with the locked state indicator that is depicted by the user interface so that the transitioned color and the displayed locked state indicator is in response to the locked state of the electronic lock.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number identifies the drawing in which the reference number first appears.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

Electrochromic User Interface Display System

Figure 1:
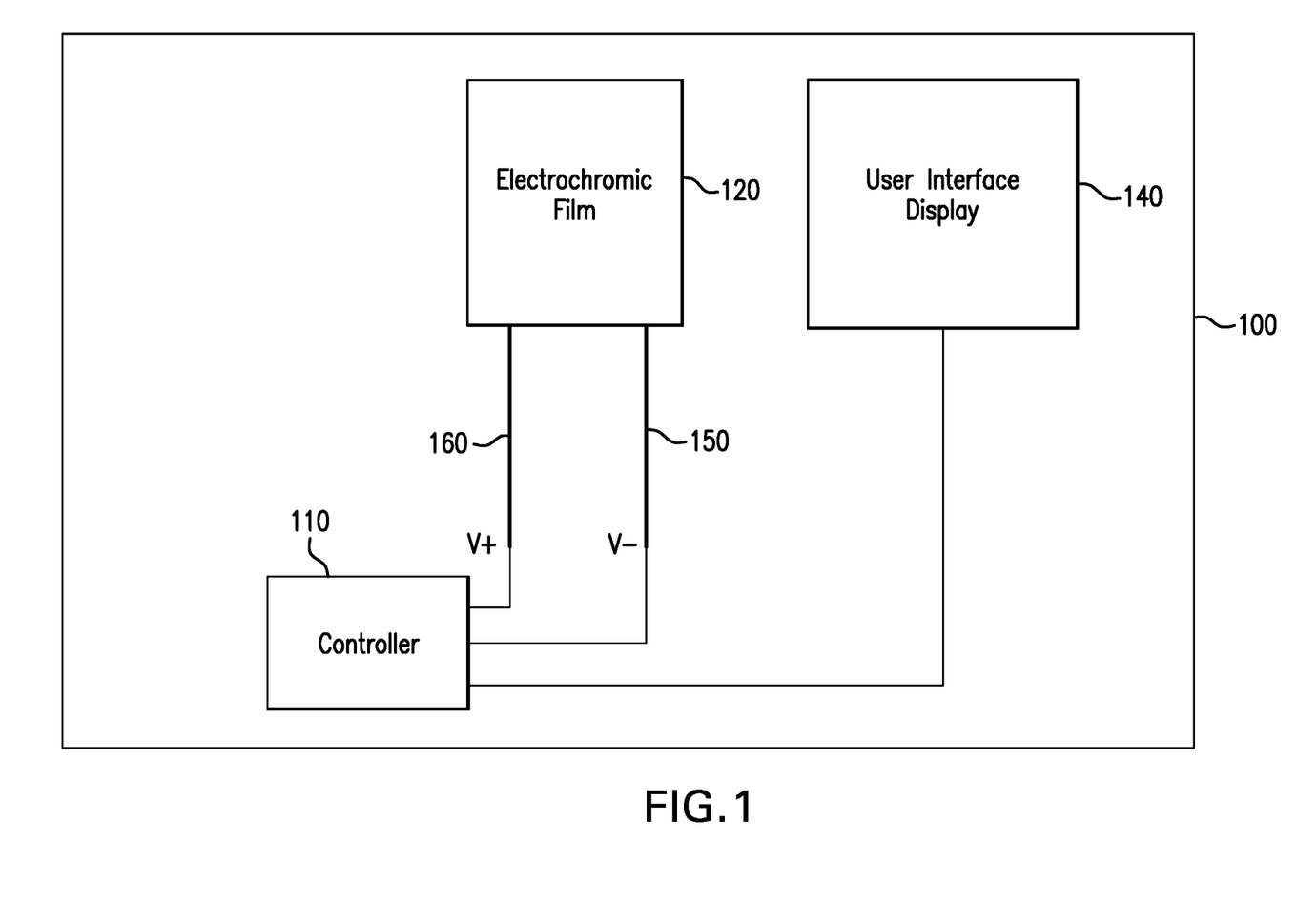
FIG. 1 is a block diagram of a user interface display system that displays visual feedback to a user as the user engages the user interface display system.

FIG. 1 is a block diagram of a user interface display system 100 that displays visual feedback to a user as the user engages the user interface display system 100. For example, the user interface display system 100 may be associated with an access control device that enables the user to receive a status of the access control device as the user engages the access control device and does so with a decrease in power consumption to display the status to the user. The user interface display system 100 includes a user interface display 140, an electrochromic film 120, and a controller 110.

The user interface display system 100 may be associated with a system that provides visual feedback to the user as the user engages the system. As the user engages the system, the user interface display system 100 may provide feedback to the user such that the user may have a better understanding of the status of the user in engaging the system. For example, the user interface display system 100 may be associated with an electronic lock that regulates the access that the user may have to a space. The user may engage the electronic lock in an attempt to gain access to the space that is regulated by the electronic lock. The feedback displayed by the user interface display system 100 may then provide the user with the status information that enables the user to have a better understanding of the status of the user engaging the access control system with the key. For example, the user interface display system 100 may provide feedback to the user to enable the user to have a better understanding as to whether the electronic lock is in the locked state or unlocked state.

The user interface display system 100 may provide feedback to the user that is attempting to engage a system that includes but is not limited to access control systems that include but are not limited to door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control system that regulates access control to a space that will be apparent to those skilled in the relevant art(s) without departing from the spirit and scope of the disclosure. Further, user interface display system 100 may provide feedback to the user that is attempting to engage any type of system where that engagement by the user with the system provides feedback to the user that is associated with the status of the electronic lock in engaging the system that may provide the user with a better understanding of the status of the electronic lock in engaging the system that will be apparent to those skilled in the relevant art(s) without departing from the spirit and scope of the disclosure.

The user interface display system 100 may be associated with an electronic lock that provides feedback to a user engaging the electronic lock. A user interface display 140 is positioned on the electronic lock and depicts to the user status patterns with each display status pattern being in response to a status of the electronic lock. Each displayed status pattern provides feedback to the user as to the status of the electronic lock. As the user engages the system associated with the user interface display system 100, the user interface display 140 of the user interface display system 100 may depict status patterns to the user that correspond to the current status of the electronic lock thereby enabling the user to have feedback with regard to the current status of the electronic lock.

Figure 2:
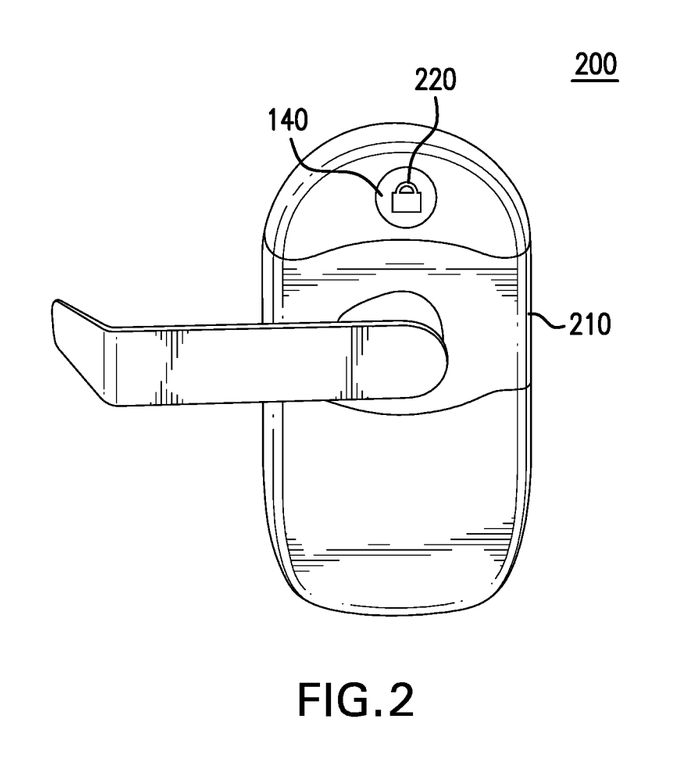
FIG. 2 depicts an elevational view of an example electronic lock that includes the user interface display.

For example, FIG. 2 depicts an elevational view of an example electronic lock 210 that includes the user interface display 140. As the user engages the electronic lock 210, the user interface display 140 may depict to the user different status patterns with each status pattern that is displayed is in response to the current status of the electronic lock 210 such that each status pattern provides different information to the user regarding the status of the electronic lock 210. In such an example, the user interface display 140 displays the status pattern 220 of a "red lock symbol" to the user indicating to the user that the status of the electronic lock 210 is that the electronic lock 210 is in the locked state. The status pattern 220 displayed by the user interface display 140 may be any type of status pattern that provides information to the user as to the status of the electronic lock 210 associated with the user interface display system 200 that will be apparent to those skilled in the relevant art(s) without departing from the spirit and scope of the disclosure.

The electrochromic film 120 may be activated in a color depicted by the user interface display 140 to correspond to the status pattern depicted by the user interface display 140. Each status pattern that is displayed to the user provides a corresponding color that is associated with the feedback that is provided to the user as to the status of the electronic lock 210. The controller 110 may transition the electrochromic film 120 to a color to correspond with the status pattern that is depicted by the user interface display 140 so that the transitioned color and the status pattern that is displayed is based on the current status of the electronic lock 210. The controller 110 may control the optical properties of the electrochromic film 120, such as but not limited to the optical transmission, absorption, and/or reflectance, in a continuous manner based on a voltage applied to the electrochromic film 120 to transition the color of the electrochromic film 120. In doing so, the optical properties of the electrochromic film 120 may also be reversed to transition the color of the electrochromic film 120 back to the original color when the controller 110 applies a different voltage to the electrochromic film 120.

The electrochromic filer 120 may provide the user interface display system 100 with the flexibility to activate different colors associated with each status pattern. Rather than the user interface display 140 activate each different status pattern to the user in a single color, the electrochromic film 120 may enable the user interface display system 100 to display each different status pattern in a color that corresponds to the status pattern to further enhance providing feedback to the user regarding the current status of the electronic lock 210. For example, returning to FIG. 2, the electronic lock 210 may transition to the locked state to prevent the user to gain access to the space regulated by the electronic lock 210. In doing so, the controller 110 may activate the electrochromic film 120 and in doing so, the electrochromic film 120 may transition from a clear state to the color "red" that corresponds to the status pattern 220 of a "lock" symbol. Rather than simply displaying the status pattern in a monochromatic color such as "white", the controller 110 may instruct the electrochromic film 120 to transition to the color "red" thereby providing additional feedback to the user in that the color "red" is typically associated by the user as being "negative" and/or "unauthorized". Thus, the additional feedback of the color "red" further provides information to the user in addition to the status pattern 220 of the "lock" symbol that the electronic lock 210 is currently in the locked state. Thereby preventing the user from having access to the space regulated by the electronic lock 210.

The user interface display system 100 may be associated with the electronic lock 210 to decrease the amount of power that is consumed by the user interface display system 100 from a power source associated with the electronic lock 210. In doing so, the electrochromic filer 120 may include an electrochromic film that when pulsed by the controller 110 transitions from a clear state to a color state in that the color state is fixed as based on the electrochromic film included in the electrochromic film 120. The electrochromic film 120 may maintain the clear state and thereby require no power from the power source associated with the electronic lock and in doing so, fail to depict the status pattern to the user. The electrochromic film 120 may then transition from the clear state to the color state when pulsed by the controller 110 to do so such that the pulse required to transition the electrochromic film 120 from the clear state to the color state requires a decreased amount of power to do so. The electrochromic film 120 may then the depict the status pattern in the color that is fixed based on the electrochromic film 120 to provide the appropriate additional feedback to the user as to the current status of the electronic lock 210 with decreased power consumed by the user interface display system 100 to do so.

Thus, the electrochromic film 120 may transition the color of the status pattern that is displayed by the user interface display 140 to correspond to the color based on the electrochromic film 120 thereby providing the user interface display 140 with the flexibility to activate status patterns with a color that corresponds to the status pattern while decreasing the amount of power consumed to do so. The controller 110 may transition the electrochromic film 120 to each color to correspond with a status pattern that is depicted by the user interface display 140 so that the transitioned color and the displayed status pattern is in response to the status of the electronic lock 210. For example, in FIG. 2, the controller 110 may instruct the electrochromic film 120 to transition into different colors to correspond to the different feedback pattern that is displayed by the user interface display 140 to the user in response to the current status of the electronic lock 310. In such an example, the controller 110 instructs the electrochromic film 120 that is associated with the user interface display 140 to transition to the color "red" such that the user interface display 140 displays the status pattern 210 of the "red lock" symbol to the user indicating that the electronic lock 210 is currently in the locked state and that the user is required to transition the electronic lock 210 to the unlocked state in order to access the space associated with the electronic lock 210.

Figure 3:
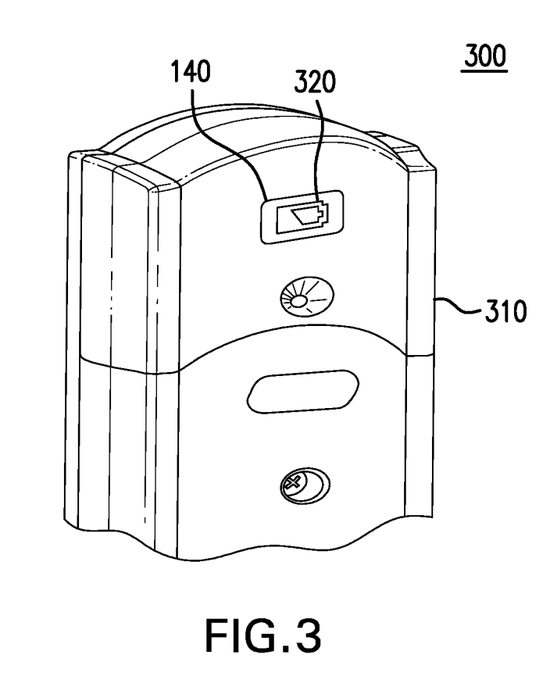
FIG. 3 depicts an elevational view of the example electronic lock that includes the user interface display that displays a different feedback pattern from FIG. 2 based on the electrochromic film that is associated with the user interface display.

However, FIG. 3 depicts an elevational view of the example electronic lock 310 that includes the user interface display 140 that activates a different feedback pattern 320 from FIG. 2 based on the electrochromic film 120 that is associated with the user interface display 140. In such an example, the controller 110 is communicating that the battery level of the battery associated with the electronic lock 310 has decreased below a battery level threshold and is thus indicative that the battery associated with the electronic lock 310 is low thereby triggering a different feedback pattern 320 to be activated by the user interface display 140 to provide feedback to the user that corresponds to the battery level of the battery being below the battery level threshold.

In doing so, the user interface display system 100 includes the flexibility to have different feedback patterns activated by the user interface display 140 with the appropriate corresponding color to provide the appropriate feedback to the user without being limited to the user interface display 140 activating a single feedback pattern that corresponds with a single color. For systems associated with the user interface display system 100 that may be battery operated, such as an access control system, user interface display system 100 may provide the flexibility with activating different feedback patterns via the user interface display 140 that correspond to different colors provided by the electrochromic film 120. In doing so such systems that require decreased power consumption as well as a decreased physical footprint, such as the electronic lock, may have an increased flexibility in the feedback patterns displayed to the user as well as an increased flexibility in the colors associated with the feedback patterns while maintaining decreased power consumption and a decreased physical footprint.

Electrochromic Film

Figure 4A:
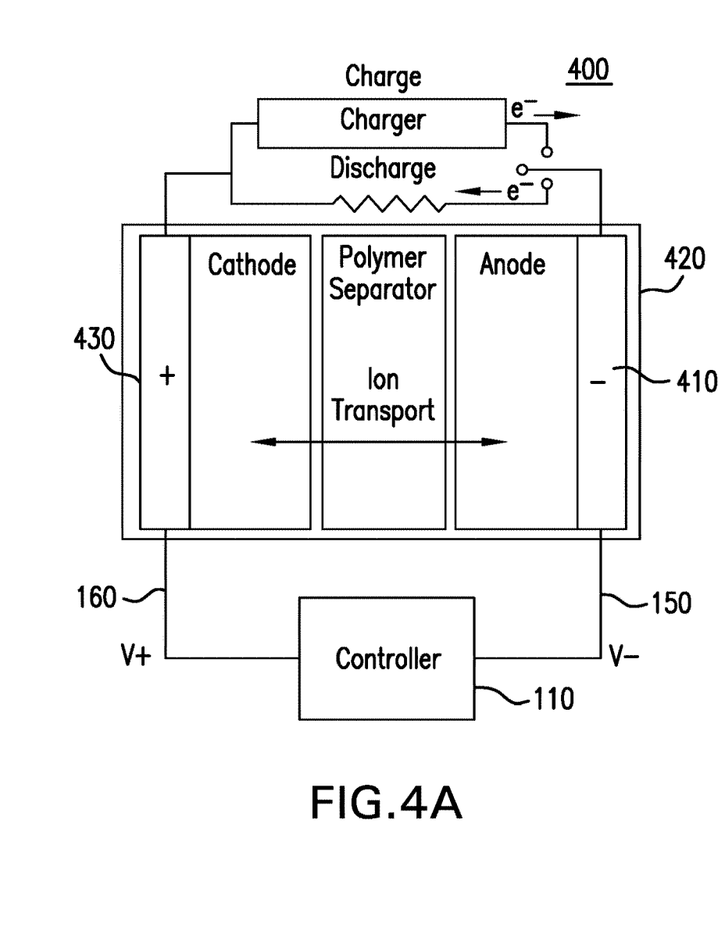
FIG. 4A is a schematic view of an electrochromic film configuration that is associated with a user interface display system.
Figure 4B:
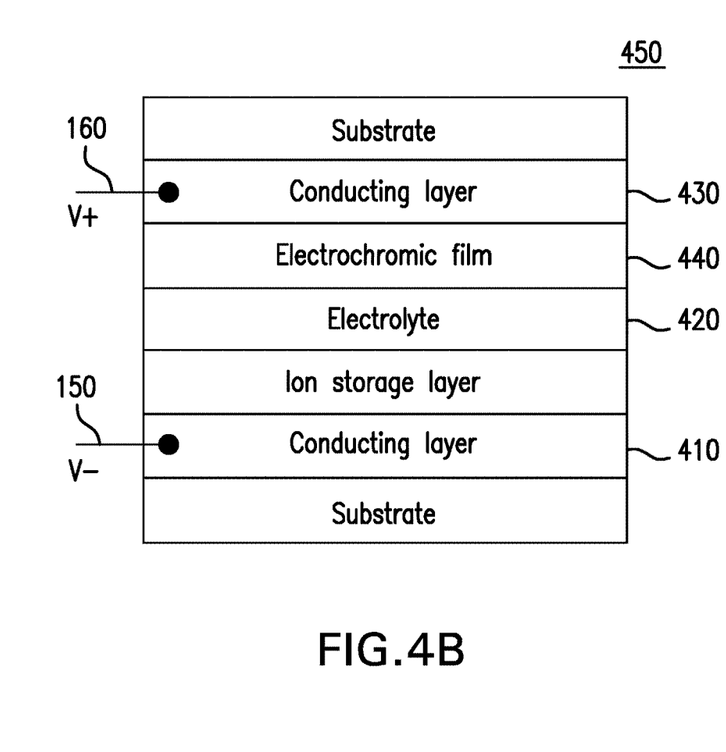
FIG. 4B is a schematic view of an electrochromic film configuration that depicts a layering view of the electrochromic film depicted in FIG. 4A.

FIG. 4A is a schematic view of an electrochromic film configuration 400 that is associated with a user interface display system. The electrochromic film configuration 400 transitions between colors as instructed by the controller 110 based on a negative voltage 150 that is applied to the electrochromic film 420 by the controller 110 and a positive voltage 160 that is applied to the electrochromic film 420. The electrochromic film configuration 400 includes the controller 110, an electrochromic film 420, a negative conducting layer 410, and a positive conducting layer 430. FIG. 4B is also a schematic view of an electrochromic film configuration 450 that depicts a layering view of the electrochromic film 420 depicted in FIG. 4A. The electrochromic film configuration 450 includes the negative conducting layer 410 that the controller 110 applies the negative voltage 150, the positive conducting layer 430 that the controller 110 applies the positive voltage 160, and an electrochromic film 440. The electrochromic film configurations 400 and 450 share many similar features with the user interface display systems 100, 200, and 300; therefore, only the differences between the electrochromic film configurations 400 and 450 and the user interface display systems 100, 200, and 300 are to be discussed in further detail.

The electrochromic film 420 includes the negative conducting layer 410, the positive conducting layer 430, and the electrochromic film 440. The electrochromic film 440 includes electrochromic materials that are bi-stable in that when the controller 110 applies the positive voltage 160 to the positive conducting layer 430, the electrochromic film 440 transitions from an active state in that the electrochromic film 440 is in a color state to an inactive state in that the electrochromic film 440 is in a clear state. The electrochromic film 440 then transitions from the inactive state in that the electrochromic film 430 is in the clear state to an active state in that the electrochromic film 430 is in the color state when the controller 110 applies the negative voltage 150 to the negative conducting layer 410. In being bi-stable, the electrochromic film 440 may remain in its current state after the controller 110 applies the positive voltage 160 and/or the negative voltage 150 until the controller 110 applies a different voltage triggering the electrochromic film 440 to change from its current state.

For example, the electrochromic film 440 may remain inactive in the clear state in that the electrochromic film 430 is clear thereby enabling the user interface display 140 to activate the color of the light source 130 until the controller 110 applies the negative voltage 150 to the negative conducting layer 410. The electrochromic film 440 may then activate and transition to the color state when the controller 110 applies the positive voltage 160 to the positive conducting layer 430 thereby enabling the user interface display 140 to activate the color of the electrochromic film 160 when activated in the color state until the controller 110 applies the positive voltage 160 to the positive conducting layer 430 and in doing so inactivating the electrochromic film 430 and transitioning the electrochromic film 430 back into the clear state.

The controller 110 may activate the electrochromic film 420 and transition the electrochromic film 420 into the color state when the controller 110 applies the negative voltage 150 to the negative conducting layer 410. In applying the negative voltage 150 to the negative conducting layer 410, a discharge of the electrochromic film 420 is triggered from the reduction oxidation of the electro potential between the cathode and the anode thereby activating the optical properties of the electrochromic film 530 to transition the electrochromic film 430 into the color state such that the user interface display 140 activates the color of the electrochromic film 430. In applying the positive voltage 160 to the positive conducting layer 430, a charge of the electrochromic film 420 is triggered from the reoxidation reaction of the electro potential between the cathode and the anode thereby deactivating the optical properties of the electrochromic film 430 to transition the electrochromic film 430 into the clear state such that the user interface display 140 reverts to the color of the background.

In doing so, the electro potential of the electrochromic film 420 may be triggered with a decreased voltage applied by the controller 110 whether the controller 110 applies the negative voltage 150 or the positive voltage 160 to the electrochromic film 420. The electrochromic film 420 may then activate into the color state when the controller 110 applies a decreased negative voltage 150 and may remain in that state until a decreased positive voltage 160 is applied. The electrochromic film 420 may then deactivate into the clear state when the controller 110 applies a decreased positive voltage 160 and may remain in that state until a decreased negative voltage 150 is applied. Thus, the electrochromic film 420 may transition colors of the feedback pattern displayed by the user interface display 140 and may maintain the displayed color while consuming decreased power. In an embodiment, the electrochromic film 420 may be activated into the color state and may maintain the color state or deactivated into the clear state and may maintain the clear state when the controller 110 applies the negative voltage 150 and/or the positive voltage 160 of 1V or less.

Electrochromic User Interface Display System Associated with an Electronic Lock

Returning to FIG. 2, the electronic lock 210 may include the user interface display 140 and depict to the user varied status patterns, such as status pattern 220, via the electrochromic film 120. In doing so, the user may receive the appropriate status from the electronic lock 210 based on the status patterns displayed to the user via the user interface display 140. The electronic lock 210 may have a decrease in power consumption based on the electrochromic film 120 transitioning between the clear state to the color state when required by the controller 110 to display the appropriate status of the electronic lock 210 to the user. The electrochromic film 120 may maintain the clear state thereby not displaying the icon associated with the electrochromic film 120 when the status depicted by the icon is not the current status of the electronic lock 210 without consuming any power from the battery source associated with the electronic lock 210. The electrochromic film 120 may then transition to the color state when pulsed by the controller 110 to thereby display the icon associated with the electrochromic film 120 when the status depicted by the icon is currently the status of the electronic lock 210. The electrochromic film 120 may consume decreased power associated with the controller 110 pulsing the electrochromic film 120 to transition the electrochromic film 120 into the color state and then no longer consuming any power from the battery source associated with the electronic lock 210 to maintain the electrochromic film 120 in the color state after transitioning from the clear state to the color state.

The battery source of the electronic lock 210 is limited in that manufacturers of the electronic lock 210 attempt to decrease the amount of power consumption from the battery source by the electronic lock 210 in order to increase the life of the battery source. The emphasis on extended battery life by the manufacturers of the electronic lock 210 is driven to decrease the frequency in which the user is required to replace the battery source of the electronic lock 210. The longer in duration that the manufacturers of the electronic lock 210 are able to extend the battery life of the battery source of the electronic lock 210 also increases the duration for the user in which the user is required to replace the battery source of the electronic lock 210. However, the user experience associated with the user engaging the electronic lock 210 is also important and that user experience includes providing feedback to the user with regard to the user engaging the electronic lock 210.

The feedback provided to the user with regard to the user engaging the electronic lock 210 includes providing the user with the status of the electronic lock 210. The status of the electronic lock provides the user with useful feedback as to the current status of the electronic lock 210. For example, the status of the battery level of the electronic lock 210 such that when the battery level of the electronic lock 210 decreases below a battery level threshold that is indicative that the battery source of the electronic lock 210 should be replaced in order to prevent the electronic lock 210 from being deactivated due to a battery source that no longer has any power to provide to the electronic lock 210 for the electronic lock 210 to operate. Providing such status feedback to the user enables the user to easily recognize that the battery source of the electronic lock 210 is required to be replaced. In another example, the status as to whether the electronic lock 210 is in the locked state provides to the user the status feedback that the electronic lock 210 is currently in the locked state and then the user may act accordingly.

However, to provide such status updates with an increased drain on the battery source of the electronic lock 210 to do so is an unnecessary allocation of power from the battery source. Although the display of status patterns to the user does provide the user with valuable feedback to the user as to the status of the electronic lock 210, providing such status feedback to the user at the cost of an increased drain on the battery source of the electronic lock 210 may not be worth such an allocation of power when power availability is limited. Thus, conventional approaches of an LED display and/or a light source that is required to activate the appropriate status pattern 220 to the user increases the amount of power drained from the battery source to do so and is an unnecessary allocation of power from the battery source.

Rather than have a constant allocation of power in order to maintain the display of the status feedback to the user as required by the conventional approaches of an LED display and/or a light source, the user interface display system 200 may simply have a pulse of voltage to be applied to the electrochromic film 120 to transition the electrochromic film 120 from the clear state to the color state. After the voltage pulse has been applied to the electrochromic film 120 to transition the electrochromic film 120 from the clear state to the color state, the electrochromic film 120 does not require any additional power allocation to maintain the electrochromic film 120 in the color state. Thus, the user interface display system 200 may display to the user the status pattern 220 indicating the current status of the electronic lock 210 while simply requiring a single voltage pulse to do so thereby significantly decreasing the amount of power required to display the status pattern 220 to the user.

The electrochromic film 120 may depict the corresponding status pattern 220 without a light source thereby decreasing a power level required to display the status pattern 220 by the user interface display 140 of the electronic lock 210. Rather than requiring a light source to emit an OLED matrix and/or a conventional LED display, the electrochromic film 120 may simply maintain the color state after simply a single voltage pulse is applied to the electrochromic film 120 by the controller 110. The appropriate pattern of the status pattern 220 may already be positioned in the user interface display 140 of the electronic lock 210. Thus, the electrochromic film 120 may simply transition and maintain the color state to display the status pattern 220 to the user based on the color of the electrochromic film 120 as positioned in the pattern included in the user interface display 140. In doing so, the electrochromic film 120 may depict the corresponding status pattern 220 without the light source thereby decreasing the power level required to display the status pattern 220 by the user interface display 140 of the electronic lock 210.

The electrochromic film 120 may depict the corresponding status pattern 220 without the light source when ambient light reflects off of the corresponding status pattern 220 enabling a user to view the corresponding status pattern 220 thereby decreasing the power level required to display the status pattern by the user interface display 140 of the electronic lock 210. As noted above, the electrochromic film 120 transitions to the color state when the controller 110 provides a voltage pulse to the electrochromic film 120. The user interface display 140 then displays the status pattern 220 to the user based on the electrochromic film 120 positioned in the pattern included in the user interface display 140 and does so without the light source. In doing so, the user interface display 140 displays the status pattern to the user after the electrochromic film 120 is transitioned into the colored state and then ambient light reflects off of the status pattern 220 with the electrochromic film 120 in the colored state enabling the user to view the status pattern 220. Thus, by relying on the reflection of ambient light rather than the light source being activated to display the status pattern 220, the power level required to display the status pattern 220 by the user interface display 140 of the electronic lock 210 is decreased.

Specifically, as shown in FIG. 2, the user interface display system 200 depicts an example of a status pattern that is displayed by the user interface 140 as a locked state indicator that displays the status feedback to the user that the electronic lock 210 is in the locked state. The user interface display 140 positioned on the electronic lock 210 depicts to the user a locked state indicator 220 being in response to a locked state of the electronic lock 210. The electrochromic film 120 positioned on the user interface display 140 transitions a color depicted by the user interface display 140 to a color "RED" to correspond to the status depicted by the user interface display 140. The displayed lock state indicator 220 provides to the user that the electronic lock 210 is in the locked state. The controller 110 transitions the electrochromic film 120 to the color "RED" to correspond with the locked state indicator 220 that is depicted by the user interface 140 so that the transitioned color "RED" and the displayed locked state indicator 220 is in response to the locked state of the electronic lock 210. The electrochromic film 120 may transition into any color to display the locked state indicator 220 to the user when the electronic lock 210 is in the locked state that will be apparent to those skilled in the relevant art(s) without departing from the spirit and scope of the disclosure.

The controller 110 may determine when the electronic lock 210 is transitioned to the locked state and in response the controller 110 may pulse the electrochromic film 120 with the negative voltage 150. In doing so, the electrochromic film 120 may transition from the clear state to the color state in which in this example the electrochromic film 120 transitions to the color "RED" when the controller 110 pulses the electrochromic film with the negative voltage 150. The electrochromic film 120 may then maintain the color "RED" as long as the electronic lock 210 is maintained in the locked state and may do so without requiring any additional power to maintain the color "RED". The user interface display 140 may include the pattern of a "locked" symbol. The user interface display 140 may then display to the user the locked state indicator 220 in the color "RED" to indicate to the user that the electronic lock 210 is in the locked state without any additional power required to display the locked state indicator 220 to the user.

The controller 110 may determine when the electronic lock 210 is transitioned to the unlocked state and in response to the controller 110 may pulse the electrochromic film 120 with the positive voltage 160. In doing so, the electrochromic film 120 may transition from the color state of "RED" to the clear state. In transitioning to the clear state, the user interface display 140 may no longer display the locked state indicator 220 to the user to indicate that the electronic lock 210 is no longer in the locked state and is in the unlocked state without any additional power required to no longer display the locked state indicator 220 to the user.

In an embodiment, the controller 110 may determine when a lever associated with the electronic lock 210 transitions from an unlocked position to a locked position thereby transitioning the electronic lock 210 to the locked state. The controller 110 may then apply the negative voltage 150 to the electrochromic film 120 when the lever associated with the electronic lock 210 transitions from the locked position to the unlocked position thereby transitioning the electrochromic film 120 to display the color "RED" and illuminating the locked state indicator 220 as displayed by the user interface display 140. The controller 110 may determine when the lever associated with the electronic lock 210 transitions from the locked position to the unlocked position thereby transitioning the electronic lock into the unlocked state. The controller 110 may then apply the positive voltage 160 to the electrochromic film 120 when the lever associated with the electronic lock 210 transitions from the locked position to the unlocked position thereby transitioning the electrochromic film 120 to the clear state and to cease illuminating the locked state indicator 220 as displayed by the user interface display 140. The lever may be associated with the locking mechanism of the electronic lock 210.

In an embodiment, the controller 110 may determine when the lever associated with the electronic lock 210 is transitioned from the unlocked position to the locked position via wireless communication from a communications device. The controller 110 may then apply the negative voltage 150 to the electrochromic film 120 when the lever associated with the electronic lock 210 is transitioned from the unlocked position to the locked position due to the wireless communication from a communications device thereby transitioning the electrochromic film 120 to display the color "RED" and illuminating the locked state indicator 220 as displayed by the user interface display 140. Thus, the controller 110 may also transition the electrochromic film 120 when the electronic lock 210 is locked by the user due to wireless communication via a communications device.

Returning to FIG. 3, user interface display system 300 depicts an example of a status pattern that is displayed by the user interface 140 as a low battery indicator that displays the status feedback to the user that the battery level of the battery source associated with the electronic lock 310 has decreased below a battery level threshold. The user interface display 140 positioned on the electronic lock 310 depicts to the user a low battery indicator 320 being in response to the battery level of the battery source associated with the electronic lock 310 having decreased below the battery level threshold. The electrochromic film 120 positioned on the user interface display 140 transitions a color depicted by the user interface display 140 to the color "RED" to correspond to the status depicted by the user interface display 140. The low battery indicator 320 provides to the user that the battery level associated with the electronic lock 310 is below a battery level threshold. The battery level threshold is indicative that the battery source associated with the electronic lock 310 is to be replaced when the battery level of the battery source is below the battery level threshold. The controller 110 transitions the electrochromic film 120 to the color "RED" to correspond with the low battery indicator 320 that is depicted by the user interface 140 so that the transitioned color "RED" and the displayed low battery indicator 320 is in response to the low battery state of the electronic lock 310. The electrochromic film 120 may transition into any color to display the low batter indicator 320 to the user when the battery source associated with the electronic lock 310 is in the low battery state that will be apparent to those skilled in the relevant art(s) without departing from the spirit and scope of the disclosure.

The controller 110 may determine when the battery source associated with the electronic lock 310 decreases below the battery level threshold. The battery level threshold may be a voltage level that is indicative that the battery level of the battery source is decreasing to a voltage level that may be insufficient for the motor of the electronic lock 310 to drive a clutch to transition the electronic lock 310 from the locked state to the unlocked state. After the battery level of the battery source decreases to the voltage level that is insufficient for the motor of the electronic lock 310 to drive the clutch to transition the electronic lock 310 from the locked state to the unlocked state, then the electronic lock 310 is unable to be transition from the locked state to the unlocked state thereby remaining in the locked state.

Thus, the battery level threshold is identified as a voltage of the battery level for the battery source such that when the battery level decreases below the battery level threshold that sufficient battery level for the battery source remains to display to the user the low battery indicator 320 as well as provide the user with sufficient time to change the battery source before the battery level of the battery sources decreases below the voltage level that is insufficient for the motor of the electronic lock 310 to drive the clutch to transition the electronic lock from the locked state to the unlocked state. For example, the battery source is a 6V battery source that has a battery level threshold of 3.5V to 4V such that the battery level indicator 320 is displayed to the user when the battery level of the battery source decreases below the battery level threshold of 3.5V to 4V. The battery level threshold may be any voltage level such that when the battery level decreases below the voltage level of the battery level threshold that the low battery indicator 320 and the user has sufficient time to replace the battery source before the battery level of the battery source is insufficient to drive the motor to transition the electronic lock 310 to the unlocked state will be apparent to those skilled in the relevant art(s) without departing from the spirit and scope of the disclosure.

The controller 110 may determine when the battery level of the battery source of the electronic lock 310 is below the battery level threshold and may pulse the electrochromic film 120 with the negative voltage 150. In doing so, the electrochromic film 120 may transition from the clear state to the color state in which in this example the electrochromic film 120 transitions to the color "RED" when the controller 110 pulses the electrochromic film with the negative voltage 150. The electrochromic film 120 may then maintain the color "RED" as long as the battery level of the battery source associated with the electronic lock 310 is maintained below the low battery threshold and may do so without requiring any additional power to maintain the color "RED". The user interface display 140 may include the pattern of a "low battery" symbol. The user interface display 140 may then display to the user the low battery indicator 320 in the color "RED" to indicate to the user that the battery level of the battery source associated with the electronic lock 310 is below the battery level threshold without any additional power required to display the low battery indicator 320 to the user.

The controller 110 may determine when the battery level of the battery associated with the electronic lock 310 is increased above the low battery threshold and in response the controller 110 may pulse the electrochromic film 120 with the positive voltage 160. In doing so, the electrochromic film 120 may transition from the color state of "RED" to the clear state. In transitioning to the clear state, the user interface display 140 may no longer display the low battery indicator 320 to the user to indicate that the battery level of the battery source associated with the electronic lock 310 is no longer below the low battery threshold without any additional power required to no longer display the low battery indicator 320 to the user.

Figure 7:
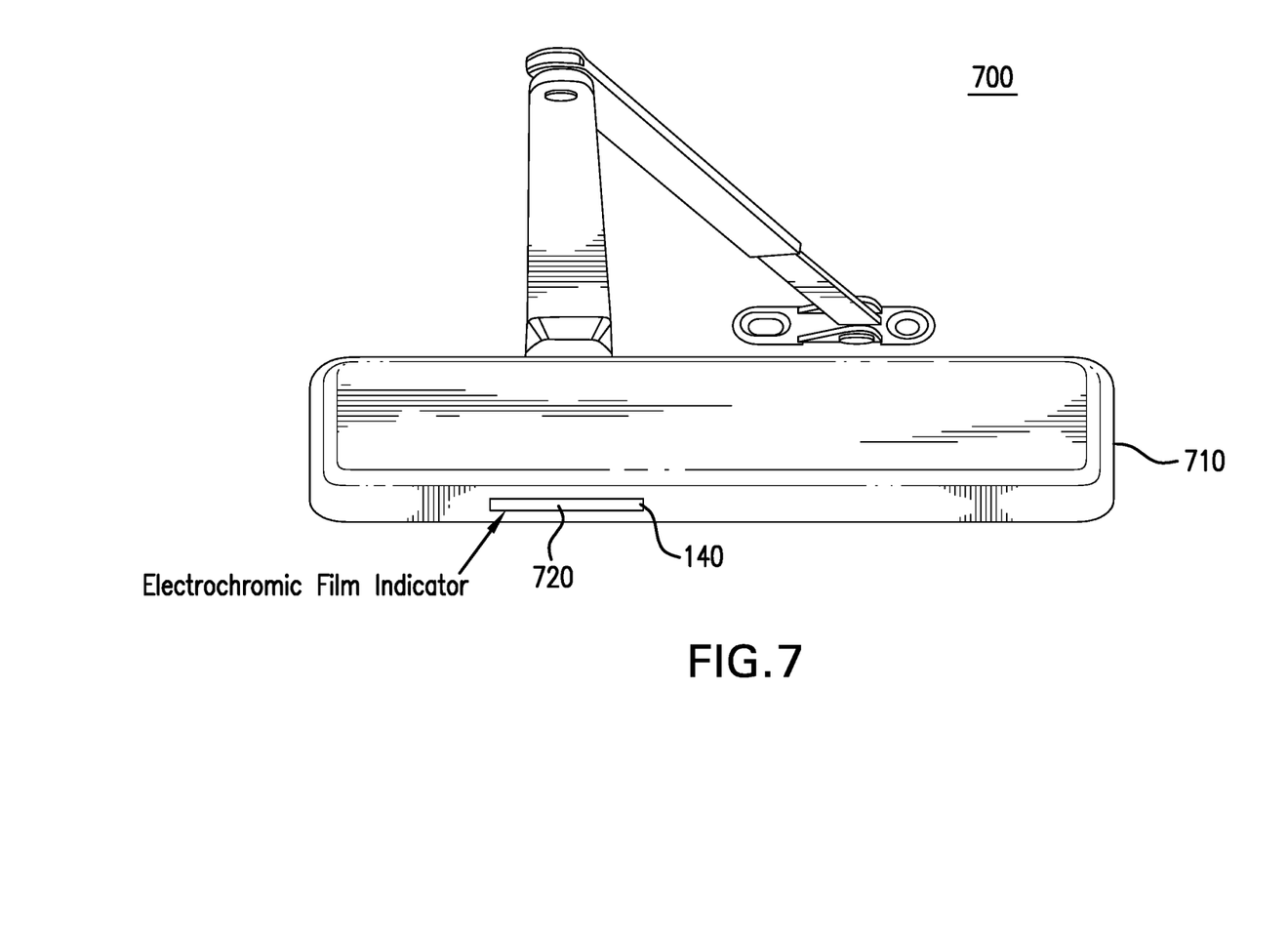
FIG. 7 is a schematic view of a door closer configuration that incorporates the user interface display including the electrochromic filter into the door closer.

In an embodiment, the user interface display 140 including the electrochromic film 120 may be positioned on a door closer 510. FIG. 7 is a schematic view of a door closer configuration 700 that incorporates the user interface display 140 including the electrochromic filter 120 into the door closer 510. In such an embodiment, the controller 110 may determine whether the door closer 710 requires service. The controller 110 may maintain the electrochromic film in a deactivated state as the door closer 510 operates properly such that the user interface display 140 remains deactivated and does not display a status pattern 720. Thus, as the door closer 510 operates properly no unnecessary power is consumed to display any unnecessary status patterns via the user interface display 140.

However, the controller 140 may then determine that the door closer requires service. The controller 140 may then pulse the electrochromic film 120 with the negative voltage 150. In doing so, the electrochromic film 120 may transition from the clear state to the color state in which in this example the electrochromic film 120 transitions to a color to thereby display the status pattern 720 of "SERVICE" via the user interface display 140 when the controller 110 pluses the electrochromic film 120 with the negative voltage 150. The electrochromic film 120 may then maintain the color state to display the status pattern 720 of "SERVICE" as long as the controller 110 determines that the door closer 510 requires service and may do so without requiring any additional power to maintain the color state. The user interface display 140 may include the pattern of the "SERVICE" symbol. The user interface display 140 may then display to the user the status pattern 720 of "SERVICE" in the color state to indicate to the user that the door closer 510 requires service without any additional power required to display the status pattern 720 of "SERVICE" to the user.

The user interface display 140 including the electrochromic film 120 may be applied to any type of access control device to display to the user the status of the access control device without any additional power to display the status pattern that will be apparent to those skilled in the relevant art(s) without departing from the spirit and scope of the disclosure.

Access Control Device System Overview

Figure 5:
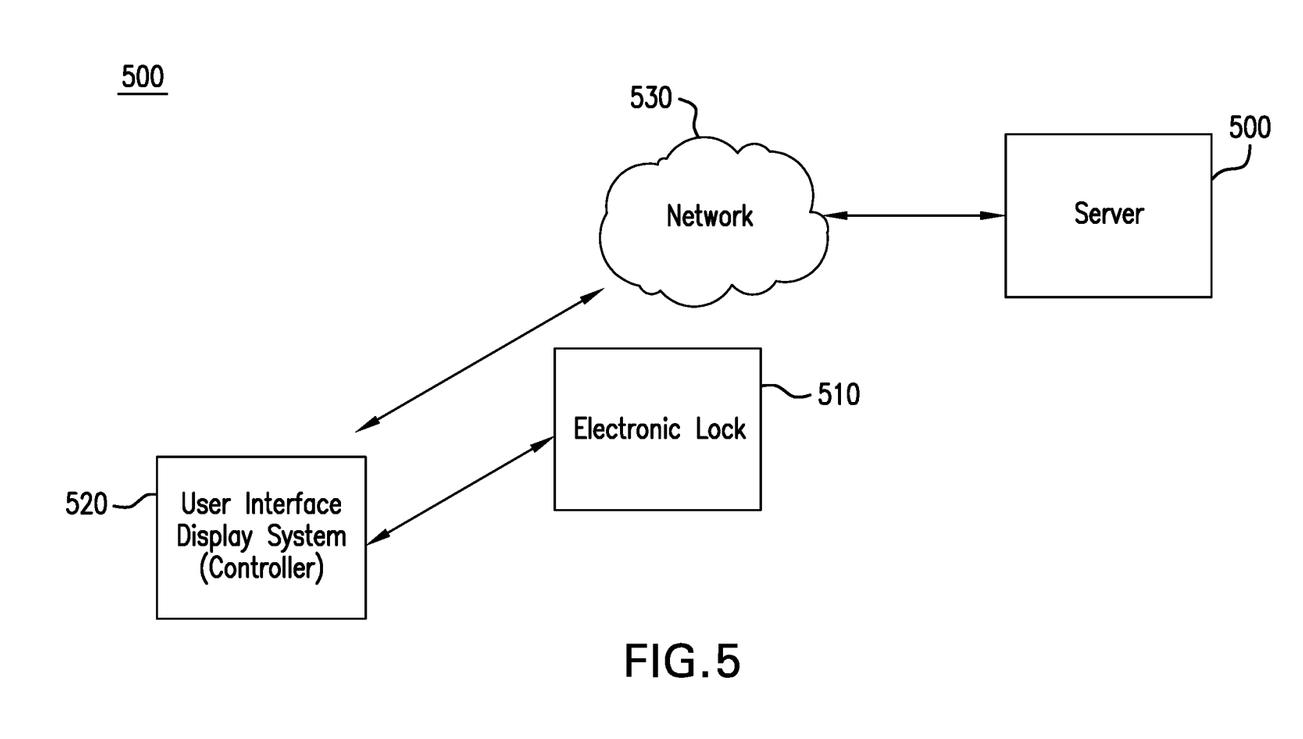
FIG. 5 is a block diagram of an exemplary electronic key configuration that incorporates the user interface display systems discussed in detail above.

FIG. 5 is a block diagram of an exemplary electronic lock configuration 500 that incorporates the user interface display systems discussed in detail above. For example, the electronic lock configuration 500 may incorporate the user interface display system 100 into the user interface display system 520 which operates as the controller for the electronic lock 510. In doing so, the user interface display system 520 as operating as the controller of the electronic lock 510 may control one or more components of the electronic lock 510 as the electronic lock 510 operates. For example, the electronic lock 510 may be an electronic lock system and the user interface display system 520 determines when the current status of the electronic lock 510 to provide feedback to the user as to the current status of the electronic lock 510.

The electronic lock 510 that the user interface display system 520 may act as the controller for may include but is not limited to electronic keys, mechanical keys, door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control device that regulates access control to a space that will be apparent to those skilled in the relevant art(s) without departing from the spirit and scope of the disclosure.

The user interface display system 520 when operating as the controller for the electronic lock 510 may control one or more components of the electronic lock 510 as the electronic lock 510 operates such as but not limited to, providing the credential associated with the user of the electronic lock, transitioning the adjustment setting of the door closer, extending/retracting a door latch, engaging/disengaging a dogging mechanism on an exit device, opening/closing a door via a door closer/operator, moving a primer mover, controlling an electric motor, and/or any other type of action that enables the electronic lock 510 to regulate the opening and/or closing of a door that provides access to a space and/or enables the door closer to adjust the adjustment setting of the door closer that will be apparent to those skilled in the relevant art(s) without departing from the spirit and scope of the disclosure.

The user interface display system 520 when operating as the controller for the electronic lock 510 may receive data from the electronic lock 510 as well any type of component included in the electronic lock 510 that may provide data to the user interface display system 520 for the user interface display system 520 to adequately instruct the electronic lock 510 as to how to operate to adequately regulate how the door opens and/or closes to provide access to the space.

For example, sensors included in the electronic lock 510 may send data to the user interface display system 520 indicating whether the status of the electronic lock 510 is in the locked state. The user interface display system 510 may then instruct the door latch to retract thereby unlocking the door and/or to extend thereby locking the door. The user interface display system 510 may receive data from any type of component included in the electronic lock 510 that includes but is not limited to sensors, credential readers, biometric sensing devices, user interface devices, and/or any other component that may provide data to the user interface display system 520 to adequately instruct the electronic lock 510 to execute actions to regulate the door providing access to the space that will be apparent to those skilled in the relevant art(s) without departing from the spirit and scope of the disclosure.

The user interface display system 520 may communicate to with the electronic lock 510 via wire-line communication and/or wireless communication. The user interface display system 520 may engage in wireless communication with the electronic key 510 that includes but is not limited to Bluetooth, BLE, Wi-Fi, and/or any other wireless communication protocol that will be apparent to those skilled in the relevant art(s) without departing from the spirit and scope of the disclosure. The user interface display system 520 may communicate with the server 540 via network 530.

System Overview

Figure 6:
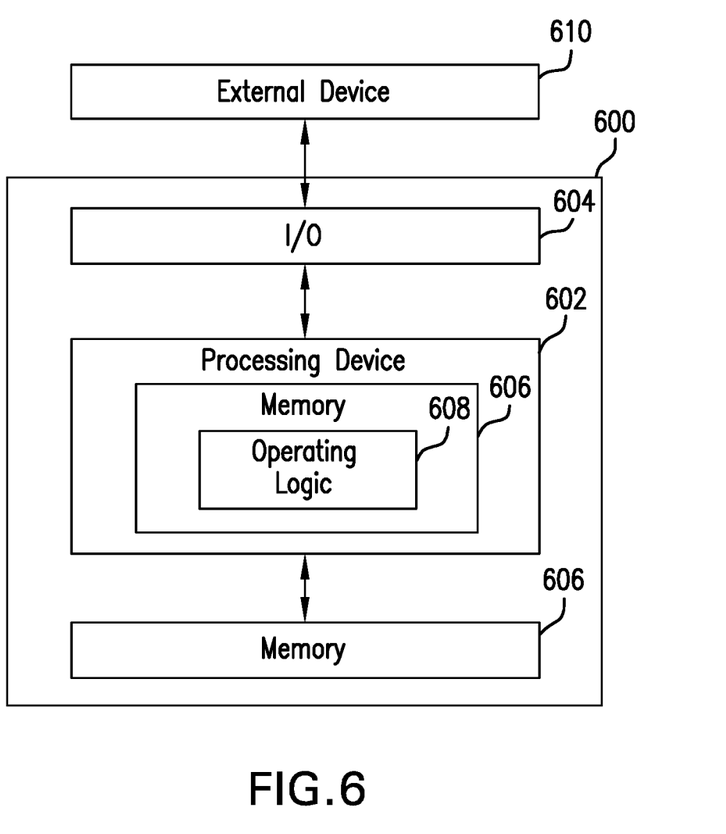
FIG. 6 is a block diagram of at least one embodiment of a computing device.

Referring now to FIG. 6, a simplified block diagram of at least one embodiment of a computing device 600 is shown. The illustrative computing device 600 depicts at least one embodiment of a controller 110 for the user interface display system 100 illustrated in FIG. 1. Depending on the particular embodiment, computing device 600 may be embodied as a reader device, credential device, door control device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communications device capable of performing the functions described herein.

The computing device 600 includes a processing device 602 that executes algorithms and/or processes data in accordance with operating logic 608, an input/output device 604 that enables communication between the computing device 600 and one or more external devices 610, and memory 606 which stores, for example, data received from the external device 610 via the input/output device 604.

The input/output device 604 allows the computing device 600 to communicate with the external device 610. For example, the input/output device 604 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, WiMAX, etc.) to effect such communication depending on the particular computing device 1200. The input/output device 604 may include hardware, software, and/or firmware suitable for performing the techniques described herein.

The external device 610 may be any type of device that allows data to be inputted or outputted from the computing device 600. For example, in various embodiments, the external device 610 may be embodied as controller 110 in the user interface display system 100. Further, in some embodiments, the external device 610 may be embodied as another computing device, switch, diagnostic tool, controller, printer, display, alarm, peripheral device (e.g., keyboard, mouse, touch screen display, etc.), and/or any other computing, processing, and/or communications device capable of performing the functions described herein. Furthermore, in some embodiments, it should be appreciated that the external device 610 may be integrated into the computing device 600.

The processing device 602 may be embodied as any type of processor(s) capable of performing the functions described herein. In particular, the processing device 602 may be embodied as one or more single or multi-core processors, microcontrollers, or other processor or processing/controlling circuits. For example, in some embodiments, the processing device 602 may include or be embodied as an arithmetic logic unit (ALU), central processing unit (CPU), digital signal processor (DSP), and/or another suitable processor(s). The processing device 602 may be a programmable type, a dedicated hardwired state machine, or a combination thereof. Processing devices 602 with multiple processing units may utilize distributed, pipelined, and/or parallel processing in various embodiments. Further, the processing device 602 may be dedicated to performance of just the operations described herein, or may be utilized in one or more additional applications. In the illustrative embodiment, the processing device 602 is of a programmable variety that executes algorithms and/or processes data in accordance with operating logic 608 as defined by programming instructions (such as software or firmware) stored in memory 606. Additionally or alternatively, the operating logic 608 for processing device 602 may be at least partially defined by hardwired logic or other hardware. Further, the processing device 602 may include one or more components of any type suitable to process the signals received from input/output device 604 or from other components or devices and to provide desired output signals. Such components may include digital circuitry, analog circuitry, or a combination thereof.

The memory 606 may be of one or more types of non-transitory computer-readable media, such as a solid-state memory, electromagnetic memory, optical memory, or a combination thereof. Furthermore, the memory 606 may be volatile and/or nonvolatile and, in some embodiments, some or all of the memory 606 may be of a portable variety, such as a disk, tape, memory stick, cartridge, and/or other suitable portable memory. In operation, the memory 606 may store various data and software used during operation of the computing device 600 such as operating systems, applications, programs, libraries, and drivers. It should be appreciated that the memory 606 may store data that is manipulated by the operating logic 608 of processing device 602, such as, for example, data representative of signals received from and/or sent to the input/output device 604 in addition to or in lieu of storing programming instructions defining operating logic 608. As shown in FIG. 6, the memory 606 may be included with the processing device 602 and/or coupled to the processing device 602 depending on the particular embodiment. For example, in some embodiments, the processing device 602, the memory 606, and/or other components of the computing device 600 may form a portion of a system-on-a-chip (SoC) and be incorporated on a single integrated circuit chip.

In some embodiments, various components of the computing device 600 (e.g., the processing device 602 and the memory 606) may be communicatively coupled via an input/output subsystem, which may be embodied as circuitry and/or components to facilitate input/output operations with the processing device 602, the memory 606, and other components of the computing device 600. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 600 may include other or additional components, such as those commonly found in a typical computing device (e.g., various input/output devices and/or other components), in other embodiments. It should be further appreciated that one or more of the components of the computing device 600 described herein may be distributed across multiple computing devices. In other words, the techniques described herein may be employed by a computing system that includes one or more computing devices. Additionally, although only a single processing device 602, I/O device 604, and memory 606 are illustratively shown in FIG. 6, it should be appreciated that a particular computing device 600 may include multiple processing devices 602, I/O devices 604, and/or memories 606 in other embodiments. Further, in some embodiments, more than one external device 610 may be in communication with the computing device 00.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has not been described above with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships are appropriately performed.

It will be apparent to those skilled in the relevant art(s) that various changes in form and in detail can be made without departing from the spirit and scope of the present disclosure. Thus the present disclosure should not be limited by any of the above-described exemplary embodiments, but should be defined only in accordance with the following claims and their equivalents.

What is claimed is:

1. A user interface display system associated with an access control device, comprising:
   a user interface display configured to depict to the user a plurality of status patterns with each displayed status pattern being in response to a status of the access control device, wherein each displayed status pattern provides feedback to a user as to the status of the access control device;
   an electrochromic film positioned on the user interface display and configured to transition a color depicted by the user interface display to correspond to the status pattern depicted by the user interface display, wherein each displayed status pattern provides a corresponding color associated with the feedback that is provided to the user; and
   a controller configured to transition the electrochromic film to each color to correspond with the displayed status pattern that is depicted by the user interface display so that the transitioned color and the displayed status pattern is in response to the status of the access control device.

2. The user interface display system of claim 1, wherein the electrochromic film is further configured to depict the displayed status pattern without a light source thereby decreasing a power level required to depict the displayed status pattern by the user interface display.

3. The user interface display system of claim 2, wherein the electrochromic film is configured to depict the displayed status pattern without the light source when ambient light reflects off of the user interface display to enable a user to view the displayed status pattern thereby decreasing the power level required to depict the displayed status pattern by the user interface display.

4. The user interface display system of claim 3, wherein the electrochromic film is further configured to depict the displayed status pattern associated with a low battery indicator without the light source and with the ambient light.

5. The user interface display system of claim 4, wherein the controller is further configured to:
   transition the electrochromic film to a red color to correspond with the displayed status pattern of the low battery indicator that is depicted by the user interface display when a battery level of a battery source associated with the access control device is below a battery level threshold.

6. The user interface display system of claim 3, wherein the electrochromic film is further configured to depict the displayed status pattern without the light source and with the ambient light.

7. The user interface display system of claim 6, wherein the controller is further configured to transition the electrochromic film to a color to correspond with the status pattern of a locked state indicator that is depicted by the user interface display when the access control device is in a locked state.

8. A method for providing feedback to a user of an access control device, comprising:
   depicting to the user a plurality of status patterns via a user interface display with each displayed status pattern being in response to a status of the access control device, wherein each displayed status pattern provides feedback to the user as to the status of the access control device;
   transitioning a color depicted by the user interface display via an electrochromic film to correspond to the displayed status pattern depicted by the user interface display, wherein each displayed status pattern provides a corresponding color associated with the feedback that is provided to the user; and
   transitioning the electrochromic film to each color via a controller to correspond with the displayed status pattern so that the transitioned color and the displayed status pattern is in response to the status of the access control device.

9. The method of claim 8, wherein the transitioning of the color by the electrochromic film comprises:
   depicting the displayed status pattern without a light source thereby decreasing a power level required to display the displayed status pattern by the user interface display.

10. The method of claim 9, wherein the transitioning of the color by the electrochromic film further comprises:
    depicting the displayed status pattern without the light source when ambient light reflects off of the displayed status pattern to enable a user to view the displayed status pattern thereby decreasing the power level required to depict the displayed status pattern by the user interface display.

11. The method of claim 10, wherein the transitioning of the color by the electrochromic film further comprises:
    depicting the displayed status pattern of a low battery indicator without the light source and with the ambient light.

12. The method of claim 11, wherein the transitioning of the electrochromic film comprises:
    transitioning the electrochromic film to a red color to correspond with the displayed status pattern of the low battery indicator when a battery level of a battery source associated with the access control device is below a battery level threshold.

13. The method of claim 9, wherein the transitioning of the color by the electrochromic film further comprises:
    depicting the displayed status pattern of a locked state indicator without the light source and with the ambient light.

14. The method of claim 13, wherein transitioning the electrochromic film further comprises:
    transitioning the electrochromic film to a red color to correspond with the displayed status pattern of the locked state indicator when the access control device is in a locked state.

15. A user interface display system for an access control device, comprising:
    a user interface display configured to depict a status of the access control device;
    an electrochromic film positioned on the user interface display and configured to transition a color depicted by the user interface display to a red color to correspond to the status of the access control device; and
    a controller configured to transition the electrochromic film to the red color to correspond to the status of the access control device.

16. The user interface display system of claim 15, wherein the electrochromic film is further configured to depict the status of the access control device without a light source thereby decreasing a power level required to display the status of the access control device.

17. The user interface display system of claim 15, wherein the electrochromic film is further configured to depict the status of the access control device without the light source when ambient light reflects off of the user interface display thereby decreasing the power level required to display status of the access control device.

18. The user interface display system of claim 17, wherein the controller is further configured to:
    determine when a lever associated with the access control device transitions from an unlocked position to a locked position thereby transitioning the access control device into a locked state; and
    apply a first voltage signal to the electrochromic film when the transitions from the unlocked position to the locked position thereby transitioning the electrochromic film to display the red color corresponding to the locked state of the access control device.

19. The user interface display system of claim 18, wherein the controller is further configured to:
    determine when the lever transitions from the locked position to the unlocked position thereby transitioning the access control device into an unlocked state; and
    apply a second voltage signal to the electrochromic film when the lever transitions from the locked positon to the unlocked position thereby transitioning the electrochromic film to display a clear color corresponding to the unlocked state of the access control device.

20. The user interface display system of claim 19, wherein the controller is further configured to:
    determine when the lever is transitioned from the unlocked position to the locked positon via wireless communication from a communications device; and
    apply the first voltage signal to the electrochromic film when the lever is transitioned from the unlocked position to the locked position in response to the wireless communication from a communications device thereby transitioning the electrochromic film to display the red color corresponding to the locked state of the access control device.

* * * * *